United States Patent [19]
Desai et al.

[11] Patent Number: 5,850,432
[45] Date of Patent: Dec. 15, 1998

[54] METHOD AND SYSTEM FOR CAPTURING AND RECORDING INFORMATION ASSOCIATED WITH A DIAL-AROUND CALL

[75] Inventors: Nailesh B. Desai, Norcross; Richard C. Schmidt, Alpharetta, both of Ga.

[73] Assignee: BellSouth Corporation, Atlanta, Ga.

[21] Appl. No.: 748,289

[22] Filed: Nov. 13, 1996

[51] Int. Cl.[6] .................................................. H04M 15/00
[52] U.S. Cl. .......................... 379/115; 379/114; 379/207; 379/230
[58] Field of Search ..................... 379/111, 112, 379/114, 115, 119, 121, 219, 220, 229, 230, 207, 201

[56] References Cited

U.S. PATENT DOCUMENTS

| | | | |
|---|---|---|---|
| 5,008,929 | 4/1991 | Olsen et al. | 379/112 |
| 5,425,090 | 6/1995 | Orriss | 379/201 |
| 5,483,582 | 1/1996 | Pugh et al. | 379/114 |
| 5,506,894 | 4/1996 | Billings et al. | 379/127 |
| 5,511,113 | 4/1996 | Tasaki et al. | 379/112 |
| 5,517,560 | 5/1996 | Greenspan | 379/114 |
| 5,737,399 | 4/1998 | Witzman et al. | 379/112 |
| 5,757,894 | 5/1998 | Kay et al. | 379/127 |

*Primary Examiner*—Curtis A. Kuntz
*Assistant Examiner*—Rexford N. Barnie
*Attorney, Agent, or Firm*—Jones & Askew, LLP

[57] ABSTRACT

A method and system of utilizing advanced intelligent network services for capturing and recording dial-around call information is provided. Dial-around calls are calls directed to a telecommunication services provider other than the services provider designated by the owner or operator of the originating telecommunications device, such as a pay telephone. When a public switched telephone network effects a "dial-around" of a pre-subscribed telecommunication services provider at a pay telephone, accounting records generated by the local telecommunication services provider do not identify that the call originated at a pay telephone. Thus, important billing and asset management data are lost to the pay telephone operator. The method and system of the present invention utilize advanced intelligent network services to recognize dial-around calls and to produce a record for the pay telephone operator which will identify and record billing and utilization information for dial-around calls. The method and system may be used without the need for expensive and time consuming hardware and software retrofit of each local switch through which each pay telephone operator operates.

16 Claims, 3 Drawing Sheets

Fig_3

METHOD AND SYSTEM FOR CAPTURING AND RECORDING INFORMATION ASSOCIATED WITH A DIAL-AROUND CALL

FIELD OF THE INVENTION

This invention relates in general to telecommunications and more particularly to a method and system for utilizing advanced intelligent network services for capturing and recording information associated with a dial-around call.

BACKGROUND OF THE INVENTION

In 1492 Columbus was warned of the dangers of sailing off the edge of a flat Earth. Fortunately, for Columbus and his crew, the Earth was proved to be more round than flat. Indeed, since the days of Columbus, the world has not only proved to be round, but with the explosion of telecommunications services, the world increasingly is being proved to be very small. In the now well-established global economy, a dramatic increase in the demand for telecommunication services has led to a corresponding increase in competition among a growing number of telecommunications companies which provide a variety of local and long distance services. Apart from local services, interexchange carriers compete to offer a number of services such as long distance and toll-free services. Typically, a subscriber of telecommunications services, whether residential, business, or pay telephone, has an agreement with a particular telecommunications service provider for the provision of services, including local, long distance and toll-free services. Accordingly, when a communication, such as a voice call, fax, or data transmission, is initiated from that subscriber's telecommunication device (e.g. telephone, fax, pay telephone, etc.), the communication is processed by the telecommunications service provider selected by the subscriber.

Frequently, however, a communication is initiated from a particular subscriber's telecommunication device, but is directed to a directory number which is associated with a different telecommunications service provider than that selected by the subscriber. An example of such a communication would include a call initiated from a pay telephone where the owner or operator of the pay telephone subscribes to Desai Communications for its local and long distance telecommunication services, but where the directory number dialed by the caller is processed by Schmidt Communications. To process such a call, local switches and networks may be programmed to recognize a dialed number associated with a telecommunications service provider other than the telecommunications service provider selected by the pay telephone owner. The switch causes the pre-subscribed telecommunications service provider to be overridden and allows the call to be connected via the telecommunications service provider associated with the dialed number. Such an override of the pre-subscribed services of the telecommunications device owner or operator (in this example, the owner or the pay telephone) is commonly referred to as a "dial-around" call because the switch literally allows the caller to dial around the pre-subscribed telecommunications service provider selected by the telecommunications device operator.

The dial-around of the pre-subscribed telecommunications service provider creates a problem for the owner or operator of the telecommunications device, particularly in the context of toll-free calls placed from pay telephones because such a call circumvents the pay telephone's compensation system. That is, the caller may dial the toll-free number from a pay telephone without placing money in the pay telephone or without the use of a calling credit card. Moreover, the dial-around of the pay telephone operator's pre-subscribed telecommunications service provider prevents the pay telephone operator from receiving a record of that call from the billing system of the pay telephone operator's pre-subscribed telecommunications service provider. Therefore, the pay telephone operator receives no record of dial-around calls for which to seek compensation or with which to analyze utilization of its pay telephones. For example, a particular pay telephone operator may subscribe to Desai Communications for its local and long distance telecommunications services. A caller using one of the pay telephone operator's pay telephones places a toll-free call, such as an 800 or 888 call. If the toll-free number is provided by Schmidt Communications, the switch must override the pre-subscribed Desai Communications services and connect the call via the telecommunications services of Schmidt Communications.

Recently, federal legislation in the United States has been passed which has brought many changes to the telecommunications industry. One of the changes will allow all pay telephone providers to receive compensation for dial-around calls originated from their pay telephones. In order to receive compensation, the telecommunications service provider to which the pay telephone is associated must identify the dial-around calls originated from pay telephones. The telecommunications service provider must be able to capture and record appropriate information in its internal billing system for every originating pay telephone call in order for the pay telephone operator to be compensated for the dial-around calls.

Pay telephones operate in the modern public switched telephone network (PSTN). The PSTN includes a variety of switches and intelligent network components. When a calling party places a dial-around call from a pay telephone, the central office switch connected to the pay telephone by a subscriber line creates a record for the communication. The record typically includes the originating station's directory number, the terminating station's directory number, and, if a long-distance call, the long-distance carrier code for the communication. The records created by the central office switches are periodically downloaded to a billing system that generates monthly telephone bills, including local as well as long-distance telephone charges.

When a dial-around toll-free telephone call is placed from a pay telephone, the central office switch queries intelligent network components of the PSTN for instructions as to how to complete the desired communication. The intelligent network components respond back to the central office switch with the destination number, but alter the record created by the central office switch due to the need of the interexchange carriers to identify the toll-free calls. As a result of this alteration, records generated at the central office switch do not contain the information needed to identify that the call was originated from a pay telephone. Consequently, the record received by the originating pay telephone operator does not include an accounting of dial-around calls. Moreover, because the pay telephone operator does not receive accurate records as to utilization of its pay telephone facilities by dial-around calls, the pay telephone operator is unable to accurately manage its assets to provide additional pay telephones in high demand areas, or to eliminate pay telephones where utilization is low.

Some systems provide records on pay telephone utilization in dial-around calls by affecting hardware and software changes at the central office switches. Such hardware and software changes must be made at each central office switch and, therefore, may be prohibitively expensive.

Accordingly, there is a need for a method and system for efficiently and inexpensively utilizing advance intelligent network services for capturing and recording information associated with dial-around pay telephone calls. Further, there is a need in the art for a method and system of capturing and recording information associated with dial-around calls originating from pay telephones for pay telephone compensation and asset utilization management.

SUMMARY OF THE INVENTION

The present invention satisfies the above described needs by providing a method and system for tracking dial-around calls made from pay telephones. The preferred method and system utilize advanced intelligent network services to recognize dial-around calls and to produce an accounting record for the pay telephone operator which will identify and record billing and utilization information for dial-around calls. The method and system may be used without the need for expensive and time consuming hardware and software retrofit of each local switch through which each pay telephone operator operates.

Stated generally, a method of capturing and recording dial-around call information is provided comprising the steps of receiving a call at a switch, causing the switch to route identification information corresponding to the call to a first intelligent network component, and causing the first intelligent network component, in response to receipt of said identification information, to determine whether a first record relating to the call should be generated. If the first intelligent network component determines that the first record should be generated, then the first intelligent network component causes the first intelligent network component to provide first instructions to the switch to generate the first record. Additionally, the first intelligent network component causes the switch to determine whether the call is a dial-around call, and if the switch determines that the call is a dial-around call, the first intelligent network component causes the switch to route the identification information to a second intelligent network component.

The second intelligent network component is caused to provide second instructions to the switch to generate a second record. In response to the instructions from the first intelligent network component and the instructions from the second intelligent network component, the switch is caused to generate the first record and the second record.

Preferably, the method of the present invention further comprises the steps of causing the switch to send the first record and the second record to a billing system, and in response to receipt of the first record and the second record, causing the billing system to generate a third record relating to the dial-around call. The method may also comprise the steps of causing the second intelligent network component to instruct the switch to route the call to a dial-around number, and causing the switch to route the call to the dial-around number.

In the preferred embodiment of the present invention, the first intelligent network component is an advanced intelligent network (AIN) service control point (SCP) and the step of causing the switch to route identification information corresponding to the call to the first intelligent network component further comprises causing the switch to route the identification information to AIN SCP. The second intelligent network component is preferably an intelligent network (IN) service control point (SCP) and the step of causing the switch to route the identification information to the second intelligent network component further comprises causing the switch to route the identification information to the IN SCP. The IN SCP may be an 800 service control point wherein the step of causing the switch to route the identification information to the IN SCP further comprises causing the switch to route the identification information to the 800 service control point.

In another aspect of the present invention, a method of capturing and recording dial-around call information is provided, comprising the steps of receiving a call at a switch, causing the switch to route identification information corresponding to the call to a first intelligent network component, causing the first intelligent network component, in response to receipt of the identification information, to determine whether a first record relating to the call should be generated, and if the first intelligent network component determines that the first record should be generated, then causing the first intelligent network component to provide first instructions to the switch to generate the first record.

Additionally, the method of this aspect of the present invention causes the switch to determine whether the call is a dial-around call, and if the switch determines that the call is the dial-around call, then causes the switch to route the identification information to a second intelligent network component. The second intelligent network component is caused to provide second instructions to the switch to generate a second record.

In response to the first instructions from the first intelligent network component and the second instructions from the second intelligent network component, the switch is caused to generate the first record and the second record, and the switch is caused to send the first record and the second record to a billing system. In response to receipt of the first record and the second record, the billing system is caused to generate a third record relating to the dial-around call.

Preferably, this aspect of the present invention further comprises the steps of causing the second intelligent network component to instruct the switch to route the call to a dial-around number, and causing the switch to route the call to the dial-around number. In the preferred form of this aspect of the present invention, the first intelligent network component is an advanced intelligent network (AIN) service control point (SCP), and the step of causing the switch to route identification information corresponding to the call to the first intelligent network component further comprises causing the switch to route the identification information to AIN SCP. The second intelligent network component is preferably an intelligent network (IN) service control point (SCP), and the step of causing the switch to route the identification information to the second intelligent network component further comprises causing the switch to route the identification information to the IN SCP. The IN SCP may be an 800 service control point and wherein the step of causing the switch to route the identification information to the IN SCP further comprises causing the switch to route the identification information to the 800 service control point.

In another aspect of the present invention, a method of capturing and recording dial-around call information is provided, comprising the steps of receiving a dial-around call at a switch, causing the switch to generate a first record relating to the dial-around call, causing the switch to generate a second record relating to the dial-around call, causing the switch to send the first record and the second record to a billing system, and in response to receipt of the first record and the second record, causing the billing system to generate a third record relating to the dial-around call.

In another aspect of the present invention, a system for capturing and recording dial-around call information is provided comprising a switch operative to receive a call; a first intelligent network component functionally connected to the switch, and a second intelligent network component functionally connected to the switch. The first intelligent network component is operative to receive identification information corresponding to the call, to determine whether the switch should generate a first record relating to the call, and to provide the switch with instructions to generate the first record. The switch is operative to read identification information associated with the call to determine whether the call is a dial-around call based upon the identification information, and to route the identification information to a second intelligent network component if the switch determines that the call is the dial-around call. The second intelligent network component is operative to receive the identification information, and to provide the switch with second instructions to generate a second record. The switch is further operative to generate the first record in response to the first instructions from the first intelligent network component, and to generate the second record in response to the second instructions from the second intelligent network component.

The system of this aspect of the present invention preferably comprises a billing system functionally connected to the switch, where the billing system is operative to receive the first record and the second record from the switch and to generate a third record relating to the dial-around call. The first intelligent network component may comprise an advanced intelligent network (AIN) service control point (SCP), and the second intelligent network component may comprise an intelligent network (IN) service control point (SCP). The IN SCP may comprise an 800 service control point.

Accordingly, it is an object of the present invention to provide an efficient and inexpensive method and system of utilizing advanced intelligent network services for capturing and recording information associated with dial-around pay telephone calls.

It is another object of the present invention to provide a method and system of capturing and recording information associated with dial-around calls originating from pay telephones for pay telephone compensation and asset utilization management.

These and other objects, features, and advantages of the present invention will become apparent upon review of the following detailed description and the attached drawings.

DETAILED DESCRIPTION

Stated generally, the preferred method and system of the present invention allow the use of advanced intelligent network services to prepare and provide pay telephone operators with a record of dial-around calls made from their pay telephones. The present invention preferably captures and records detailed information on all calls (including dial-around calls) made from pay telephones for the purposes of compensation billing and asset management. Records provided by the present invention may include call disposition information, dialed number, date, time and call duration, or an identification number, known as a carrier identification code (CIC), for the telecommunications service provider processing the call. Analysis of these records provides insight into the utilization levels of pay telephones. High utilization may suggest that additional telephones are necessary, while low utilization may suggest the need to remove or relocate telephones.

DESCRIPTION OF THE PREFERRED ENVIRONMENT FOR THE PRESENT INVENTION

The modern public switched telephone network (PSTN) forms the basic environment of the present invention. The modern public switched telephone network has separate signaling paths for voice signals (or other customer-utilized communication circuits) and for control signals, which include information transmitted throughout the network to control the connection and disconnection of the voice circuits.

In the late 1970s and early 1980s, American Telephone & Telegraph Company (AT&T) developed an early species of common channel interoffice signaling (CCIS). CCIS is essentially a network architecture for a switched telephone network in which information about a telephone call is transmitted over high speed data links that are separate from the voice circuits that are used to transmit the signals of the call itself. Early in the development of common channel interoffice signaling, it was recognized that the interoffice data signaling links could be designed to provide high speed digital data that could first determine whether a call could be completed prior to assigning trunk capacity to set up the voice link. Thus, with common channel interoffice signaling the identity of the dialed number can be transmitted over the interoffice signaling data links from the originating central office to the terminating central office, which is the central office that services the dialed or called number.

If the dialed number is busy, data representing this information is transmitted back over the interoffice signaling link to the originating central office that locally provides an audible busy signal to the caller. Therefore, no long distance trunk capacity is occupied during this process, and the voice circuits remain free for other uses. If the dialed number is not busy, various devices in the network respond to the information about this call to assign interoffice trunks to set up a connection for the call. While the call is being set up, the originating central office, based on a signal from the terminating central office, returns an audible ring back tone (RBT) to the caller. Once the dialed number is answered, an answer signal is passed from the terminating central office to the originating central office, the ring back tone is terminated, and the call is completed.

Figure 1:
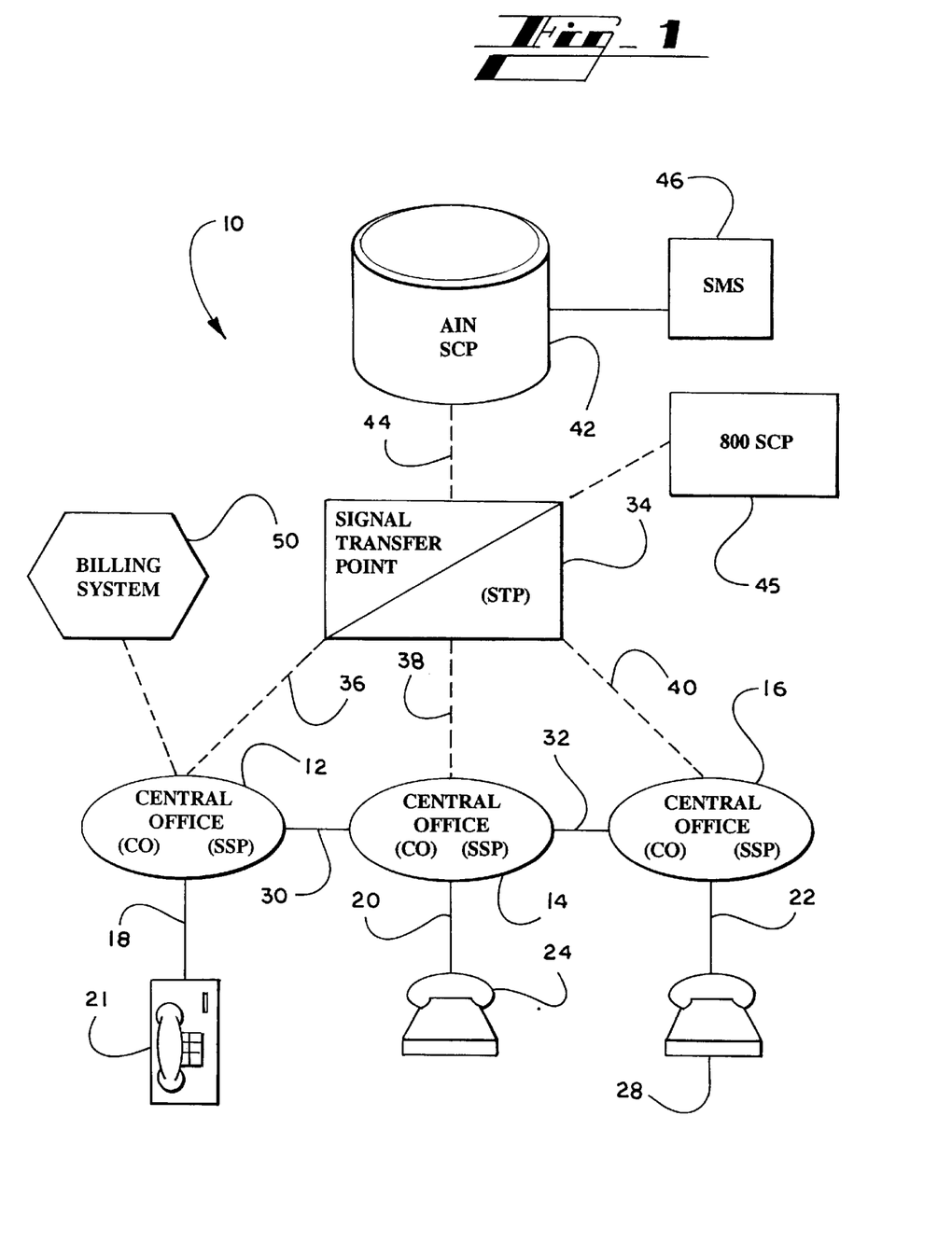
FIG. 1 is a block diagram of a portion of the existing advanced intelligent network (AIN) in a telephone system that forms the environment for the preferred embodiment of the present invention.

The public switched telephone network that evolved in the 1980s incorporated the advanced intelligent network (AIN). Some of the components of the advanced intelligent network are illustrated in FIG. 1. FIG. 1 is a block diagram representing at least a part of the advanced intelligent network (AIN) 10 of a typical local exchange carrier. The advanced intelligent network (AIN) uses the signaling system 7 (SS7) network for signal or system control message transport. The components thereof are well known to those skilled in the art. The operation of many of the components of the advanced intelligent network is also described in U.S. Pat. No. 5,245,719 to Weisser entitled "Mediation of Open Advanced Intelligent Network Interface by Shared Execution Environment" which is incorporated herein by reference. The SS7 communications protocol is provided in the document entitled "Bell Communications Research Specification of Signaling System 7," Document TR-NWT-000246, Issue 2 (June 1991), plus Revision 1 (December 1991), which is also incorporated herein by reference.

Referring still to FIG. 1, a plurality of central offices is provided in a typical public switched telephone network. As shown in FIG. 1, each central office may include an electronic switch known to those skilled in the art as a service switching point (SSP). These are indicated in FIG. 1 as SSP switches 12, 14, and 16. The number of SSP switches depends on the number of subscribers to be served by the public switched telephone network. An SSP (specifically, a Class 5 central office switch) is the AIN component of a typical electronic central office switch used by a local exchange carrier. The terms "SSP" and "switch" are used interchangeably hereinafter and are understood to refer to a telecommunications switch having AIN capability and which may be utilized for connecting voice channel circuits, including voice channel lines, such as lines 30 and 32.

As shown in FIG. 1, central offices switches (SSP) 12, 14, and 16 have a plurality of subscriber lines 18, 20, and 22 connected thereto. Each of the subscriber lines 18, 20, and 22 is connected to a terminating piece or pieces of customer premises equipment that are represented by pay telephone 21 and standard telephone sets 24 and 28. SSP switches 12, 14, and 16 are connected by a plurality of trunk circuits indicated as 30 and 32 in FIG. 1. These are the voice path trunks that interconnect the central offices 12, 14, and 16 and over which calls are connected when completed.

Each piece of terminating equipment in the PSTN is preferably assigned a directory number. The term "directory number" is used herein in a manner consistent with its generally understood meaning of a number that is dialed or input by an originating party at an originating station to reach a terminating station associated with the directory number. A directory number, typically a ten digit number, is commonly referred to as a "telephone number" and may be assigned to a specific telephone line, such as the telephone line 18 shown in FIG. 1.

Much of the intelligence, and the basis for many of the new enhanced features of the network reside in the local AIN service control point (SCP) 42 that is connected to signal transfer point 34 via SS7 data link 44. As is known to those skilled in the art, AIN service control points, such as AIN SCP 42, are physically implemented by relatively powerful fault tolerant computers. Among the functions performed by the service control points are maintenance of network data bases used in providing enhanced services.

Service control point (SCP) computers were initially introduced into the network to handle the necessary translations and billing transactions for the implementation of 800 number service, that is, toll free (to the caller) long distance service. An 800 SCP is illustrated in FIG. 1 as 800 SCP 45. The 800 SCP 45 is an intelligent network (IN) service control point. IN service control points do not embody all the intelligent functionality of the later generation advanced intelligent network (AIN) service control points, such as AIN SCP 42. The functional distinction between the AIN SCPs and the IN SCPs is well known to those skilled in the telecommunications art.

Additional devices for implementing advanced network functions within the AIN 10 are provided by a regional STPs (not shown), regional AIN SCPs (not shown), and a service management system (SMS) 46. Both the regional AIN SCPs and the local AIN SCP 42, which represent a plurality of local AIN SCPs distributed throughout the AIN 10, are connected via respective data links to the SMS 46. The SMS 46 provides a centralized platform for remotely programming the various AIN SCPs of the AIN 10 so that a coordinated information processing scheme may be implemented for the AIN 10. The SMS 46 is implemented by a large general purpose computer and interfaces to business offices of the local exchange carrier and interexchange carriers. SSPs download, on a non-real time basis, billing information to a billing system 50 that is needed in order to appropriately invoice subscribers for the services provided.

For preparation of billing information, the subscriber's pre-subscribed telecommunications service provider is generally responsible for maintaining records for both local and long distance services and producing billing statements for individual subscribers. The billing system 50 produces these billing statements, which are typically mailed to subscribers on a periodic basis. Information may be downloaded from the SSP 12 to the billing system 50 in association with the preparation of the billing statements. As is well known to those skilled in the art, the billing system 50 includes large general purpose computing devices which can accumulate billing information and produce desired accounting records. The operation of a billing system of a telecommunications service provider, such as the billing system 50, is well known to those skilled in the art.

It will be appreciated that the billing system 50 may prepare records for each subscriber on a per-communication basis. These per-communication records for a particular subscriber are typically created by the originating switch that services the subscriber's line. Preferably, the AIN central office switches, such as SSP 12, create call records which contain AIN Automatic Message Accounting (AIN AMA) records and call disposition information (e.g. answered, busy, etc.). The AIN AMA record is the message accounting protocol currently implemented in the AIN and is well known to those skilled in the art.

For each AIN communication, an AIN AMA record is created preferably which contains the originating number, the terminating number, and the connection duration. By contrast, when the SSP 12 processes a toll-free call, such as an 800 call, through the 800 SCP 45, the SSP 12 creates a Carrier AMA record (also known as an 800 AMA record). The Carrier AMA record includes the originating number, the terminating number, the connection duration, and the carrier identification code (CIC) associated with the telecommunication service provider providing the 800 service. The per-communication records created by the SSP 12 for the subscriber line 18 are periodically downloaded to the billing system 50 on a non-real time basis. The billing system 50 computes the costs for the communications represented by the various records and prepares billing statements to be mailed to the subscriber.

In operation, the intelligent network elements of the AIN 10, as described above, communicate with each other via digital data messages transmitted over the network of digital data links. An SSP may be configured to interface with these network elements through the use of a trigger. A trigger in the network is an event associated with a particular subscriber line or call that causes the SSP to generate a data packet message to be sent to a service control point. In order to keep the processing of data and calls as simple and generic as possible at central office switches, such as SSP central office switches 12, 14, and 16, a relatively small set of triggers are defined at the SSP central office switches for each call.

The message created by an SSP 12 in response to a trigger is known as a "query" message. A query message opens a "transaction" and the SSP generally holds the communication until it receives a reply from an appropriate network element via the network of digital data links instructing the SSP 12 to take a certain action. If the SSP 12 receives no instructions within a certain amount of time, the SSP "times-out" and executes a default task for the communication. The reply to the query message may be a "conversation" message or a "response" message. Conversation messages allow for bi-directional exchanges between network elements while the transaction remains open. A "response" message closes the transaction opened by the query message, and usually instructs the SSP 12 to route the held communication for connection with a terminating station. Query messages, conversation messages, and response messages are standard types of messages defined by the AIN protocol. The details of the AIN protocol are well known to those skilled in the art and will not be further described herein. For more information regarding the AIN protocol, see Bellcore Specification GR-1298-CORE Switching Systems Generic Requirements for AIN 0.1, which is incorporated herein by reference.

DESCRIPTION OF THE PREFERRED EMBODIMENT

The preferred embodiment of the present invention provides a method and system to capture and record information associated with dial-around calls originating from pay telephones and provides the pay telephone operators with a record which identifies the dial-around calls and aids the pay telephone operator with compensation billing and asset management. As discussed in the Background Section, a dial-around call occurs when the switch causes the pre-subscribed telecommunications service provider to be over-ridden and allows the call to be connected via the telecommunications service provider associated with the dialed number.

Figure 2:
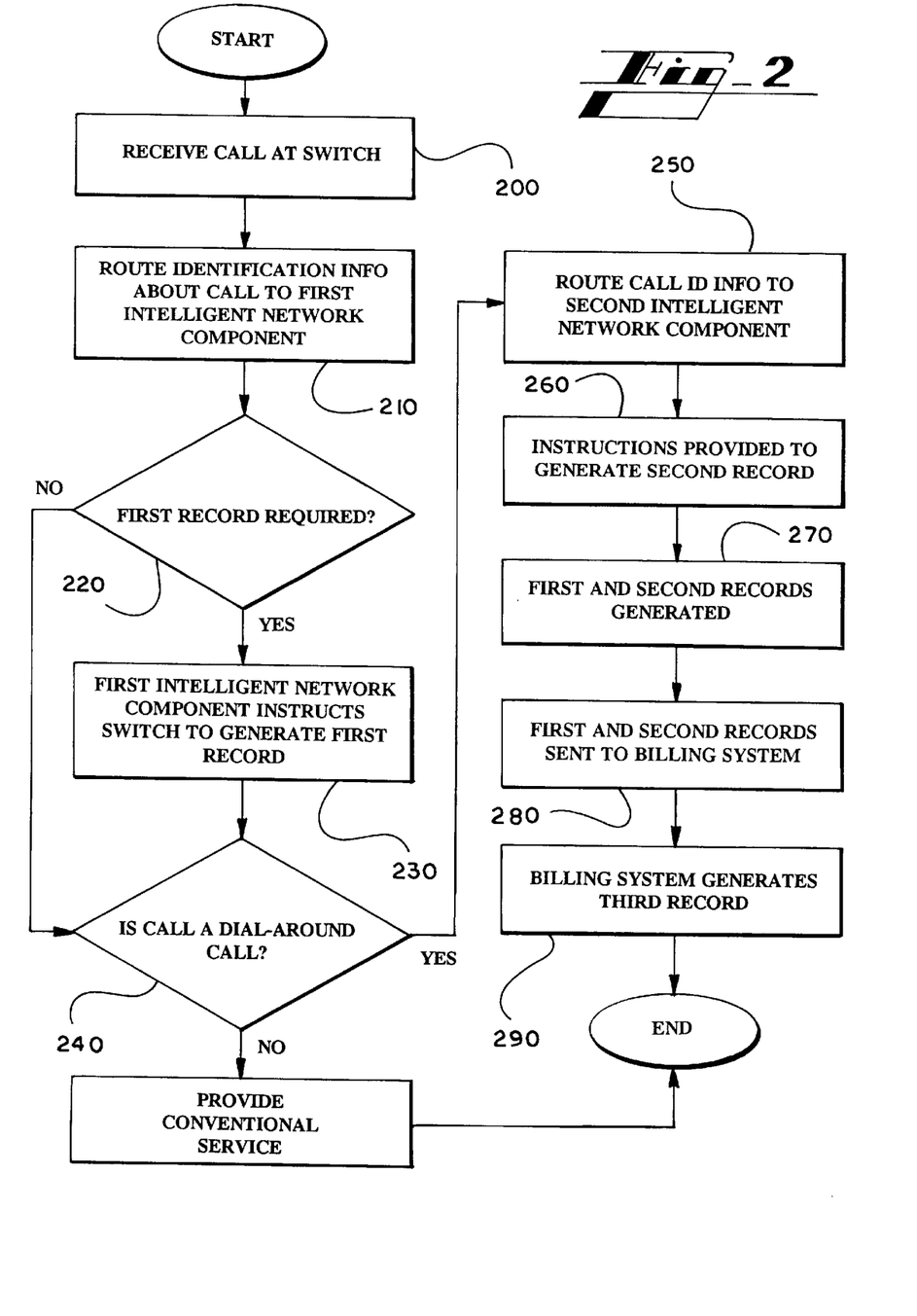
FIG. 2 is a flow chart illustrating the preferred method of the present invention.

Referring to FIG. 2, FIG. 2 is a flow chart illustrating the preferred method of the present invention. In the preferred embodiment of the present invention, when the calling party goes off hook at a pay telephone to initiate a call, the SSP 12 encounters an off-hook delay (OHD) trigger. An OHD trigger causes the SSP 12 to delay or suspend processing of any communication initiated by the calling party until an appropriate number of digits is entered by the calling party. That is, when the calling party lifts the telephone hand set off the hook, the SSP 12 at the central office delays sending any data packet message to other network components until an appropriate number of digits is entered. For example, if a calling party lifts the pay telephone hand set off the hook and enters only two digits and the SSP 12 is programmed with an off-hook delay trigger, the SSP 12 will wait until the calling party enters additional digits equaling an appropriate number of digits, such as 7 digits or 10 digits.

As shown in FIG. 2, at step 200, the switch receives the call after the calling party dials the appropriate number of digits at pay telephone 21. At step 210, the SSP 12 formulates a query and sends the query to a first intelligent network component (AIN SCP 42). The query contains identification information associated with the call such as the digits dialed by the calling party and information indicator (II) digits. As is well known to those skilled in the art, II digits are codes which give the AIN information about the telecommunication device from which the communication has originated, such as a pay telephone, a residence, a restricted telecommunication device, a hotel/motel, etc. At step 220 the AIN SCP 42 determines whether the SSP 12 should create a first record (AIN AMA record). At step 230, in response to the query, the AIN SCP 42 provides first instructions to the SSP 12 to create an AIN AMA record, and the AIN SCP 42 passes the dialed digits back to the SSP 12 for call completion.

At step 240, in response to instructions from the AIN SCP 42, the SSP 12 analyzes the digits passed from the AIN SCP 42 to determine how the call should be routed to the destination corresponding to the dialed digits. If the digits entered by the calling party are associated with the pre-subscribed telecommunications service provider utilized by the operator of the pay telephone from which the call originated, the SSP 12 will follow the "NO" branch at step 240 and will route the call according to some other conventional call protocol. However, if the dialed digits are associated with a telecommunications service provider different from that utilized by the operator of the pay telephone, the SSP 12 follows the "YES" branch at step 240 and effects a "dial-around" of the pre-subscribed telecommunications service provider in order to route the call via the alternate telecommunications service provider associated with the dialed number.

At step 250, when the SSP 12 encounters dialed digits associated with the alternate telecommunications service provider, the SSP 12 formulates and sends a query to a second intelligent network component. At step 260 the second intelligent network component provides instructions to the SSP 12 to create a second record (Carrier AMA record) and to complete the call.

During analysis of the dialed digits received from the AIN SCP 42, if the SSP 12 encounters dialed digits associated with an 800/888 call, the SSP 12 will formulate and route a query to the second intelligent network component as described. In the case of an 800/888 call the second intelligent network component is preferably an 800 SCP 45. The 800 SCP 45 queries its data base for the telecommunications service provider associated with the 800/888 number dialed by the calling party. At step 260, in response to the query, the 800 SCP 45 directs the SSP 12 to generate a Carrier AMA record and provides the SSP 12 with the dialed digits necessary to complete the call.

In response to the dialed digits received from the 800 SCP 45, the SSP 12 will route the call to the destination corresponding to the 800/888 number dialed by the calling party via the telecommunications service provider associated with the 800/888 number. If that telecommunications service provider is not the telecommunications service provider pre-subscribed by the pay telephone operator from which the call is originated, then the routing of the telephone call via the telecommunication service provider associated with the 800/888 number will effect a "dial-around." The "dial-around" is effected when the SSP 12 routes the call around the pre-subscribed telecommunication service provider associated with the pay telephone to an alternate telecommunication service provider associated with the 800/888 number dialed by the calling party.

In the preferred embodiment, the first and second records (AIN AMA record and Carrier AMA record) are created by the SSP 12 at step 270. At step 280 the first and second records are sent to the billing system 50. In the preferred embodiment, the billing system 50 merges the first and second records and creates a third record (also referred to herein as a "dial-around record") for the pay telephone operator. The third record preferably contains the pay telephone identifier, an identification code for the telecommunications service provider utilized to complete the communication, and the call accounting and utilization information described above.

In an alternate embodiment, the billing system 50 may take information from the Carrier AMA record, such as the identification code of the telecommunications service provider utilized for the communication, and import it to the AIN AMA record for provision to the pay telephone operator. In the case of long distance calls or toll free 800/888 calls, the record provided to the pay telephone operator preferably contains a carrier identification code (CIC) associated with the telecommunications service provider through which the long distance or 800/888 call is carried.

OPERATION OF THE PREFERRED EMBODIMENT

Figure 3:
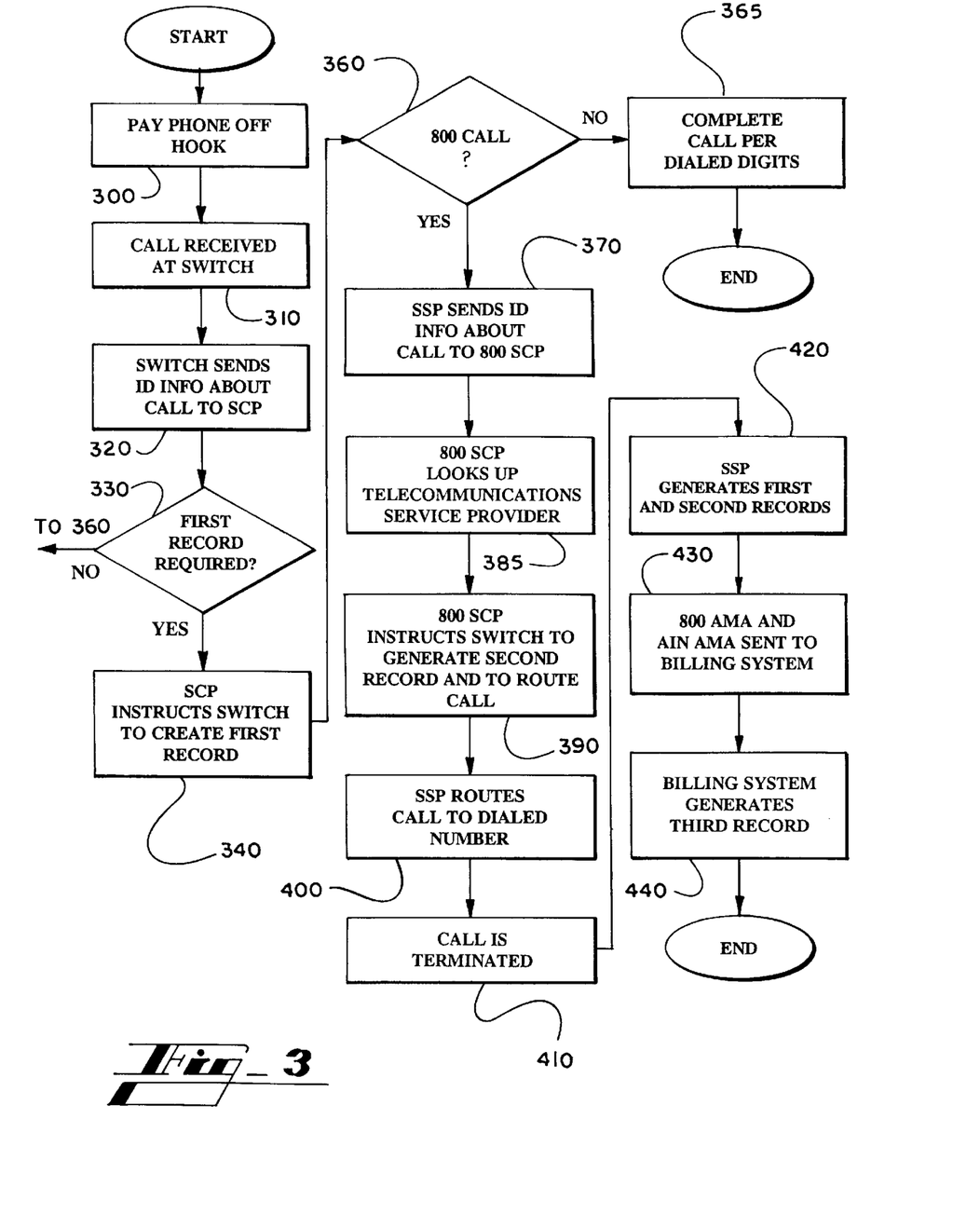
FIG. 3 is a flow chart illustrating an example operation of the preferred method of the present invention.

The method and system of the preferred embodiment of the present invention is best illustrated by showing, as an example, how the method and system process a dial-around toll-free 800 call initiated by a calling party from a pay telephone. Referring now to the drawings, FIG. 3 is a flow chart showing the steps performed in the preferred embodiment of the present invention in handling a call directed to a toll-free 800 number from a pay telephone. Numbered hardware components refer to FIG. 1.

At step 300, a calling party takes the pay telephone hand set off hook at pay telephone 21 to initiate an 800 toll-free telephone call. At step 310, SSP 12 recognizes the OHD trigger provisioned by the pay telephone's line 18 at step 300. The SSP 12 delays digit analysis and suspends call processing until an appropriate number of digits are entered by the calling party. After an appropriate number of digits are entered by the calling party, the SSP 12, at step 320, formulates a query and sends it to the AIN SCP 42 via STP 34. The query sent to the AIN SCP 42 contains identification information corresponding to the call, such as the dialed digits and the II information from pay telephone set 21.

At step 330, the AIN SCP 42 in response to the query from the SSP 12, reads the dialed digits and performs a database look up and determines whether a first record should be generated by the switch. If not, the method proceeds to step 360 for digit analysis. If yes, at step 340, the AIN SCP 42 instructs the SSP 12 to create a first record (AIN AMA record) with the required information (e.g., date, time, etc.), and the AIN SCP 42 passes the dialed digits (in this example the 800 digits) as a destination number to the SSP 12 for completion of the call.

At step 360, the SSP 12 analyzes the digits passed from the AIN SCP 42 in order to route the call to the destination number. During analysis of the digits passed from the AIN SCP 42, the SSP 12 also determines whether the call is directed to an 800 number. In the event that the call is not directed to an 800 number, the method follows the "NO" branch to step 365 and completes the call in accordance with the dialed digits as passed by the AIN SCP 42. In the present example, the SSP 12, at step 360, recognizes that the dialed digits are directed to an 800 number. Therefore, the SSP 12 follows the "YES" branch to step 370. At step 370, the SSP 12 formulates and sends a query containing the identification information corresponding to the call to the 800 SCP 45.

At step 385, the 800 SCP 45 performs a database look-up to determine which telecommunications service provider corresponds to the digits passed from the SSP 12. At step 390, the 800 SCP 45 sends a response to the SSP 12 which includes a four digit carrier identification code (CIC) identifying the appropriate telecommunications service provider, and the 800 SCP 45 instructs the SSP 12, to generate a second record (Carrier AMA record). As is well known to those skilled in the art, the four digit carrier identification code tells the SSP 12 how to route the call through to the appropriate telecommunications service provider. It is at this point that the switch is "dialing-around" the pay telephone's pre-subscribed telecommunications service provider. At step 390, in addition to providing the SSP 12 with the appropriate carrier identification code, the 800 SCP 45 also instructs the SSP 12 to route the call. At step 400, the call is routed to the destination associated with the dialed number. At step 410, the call is terminated by the calling party.

At step 420, in response to the instructions from the AIN SCP 42 at step 340, and in response to the instructions from the 800 SCP 45 at step 385, the SSP 12 generates an AIN AMA record and a Carrier AMA record. In addition, at step 410, the SSP records the disposition of the call (for example, answered, busy, etc.). At step 430, the AIN AMA record and the Carrier AMA record are sent to the billing system 50. At step 440, the billing system 50 generates a third record for provision to the pay telephone operator by selectively combining the information from the AIN AMA record and the Carrier AMA record, as discussed above.

Advantageously, the present invention provides a method and system for capturing and recording information associated with a dial-around call originating from a pay telephone. The present invention provides accounting and utilization records to operators of pay telephones which allows them to receive compensation for dial-around calls and to manage pay telephone assets more efficiently. While this invention has been described in detail with particular reference to the preferred embodiments thereof, it will be understood that variations and modifications can be effected within the spirit and scope of the invention as described herein and as defined in the appended claims.

What is claimed is:

1. In an intelligent switched telecommunications network, a method of capturing and recording dial-around call information, comprising the steps of:

receiving a call at a switch;

causing said switch to route identification information corresponding to said call to a first intelligent network component;

causing said first intelligent network component, in response to receipt of said identification information, to determine whether a first record relating to said call should be generated;

if said first intelligent network component determines that said first record should be generated, then causing said first intelligent network component to provide first instructions to said switch to generate said first record;

causing said switch to determine whether said call is a dial-around call;

if said switch determines that said call is said dial-around call, then causing said switch to route said identification information to a second intelligent network component;

causing said second intelligent network component to provide second instructions to said switch to generate a second record; and in response to said first instructions from said first intelligent network component and said second instructions from said second intelligent network component, causing said switch to generate said first record and said second record.

2. The method of claim 1, further comprising the steps of:

causing said switch to send said first record and said second record to a billing system; and in response to receipt of said first record and said second record, causing said billing system to generate a third record relating to said dial-around call.

3. The method of claim 1, further comprising the steps of:

causing said second intelligent network component to instruct said switch to route said call to a dial-around number; and causing said switch to route said call to said dial-around number.

4. The method of claim 1, wherein said first intelligent network component is an advanced intelligent network (AIN) service control point (SCP), and wherein said step of causing said switch to route said identification information corresponding to said call to said first intelligent network component further comprises causing said switch to route said identification information to said AIN SCP.

5. The method of claim 1, wherein said second intelligent network component is an intelligent network (IN) service control point (SCP), and wherein said step of causing said switch to route said identification information to said second intelligent network component further comprises causing said switch to route said identification information to said IN SCP.

6. The method of claim 5, wherein said IN SCP is an 800 service control point, and wherein said step of causing said switch to route said identification information to said IN SCP further comprises causing said switch to route said identification information to said 800 service control point.

7. In an intelligent switched telecommunications network, a method of capturing and recording dial-around call information, comprising the steps of:

receiving a call at a switch;

causing said switch to route identification information corresponding to said call to a first intelligent network component;

causing said first intelligent network component, in response to receipt of said identification information, to determine whether a first record relating to said call should be generated;

if said first intelligent network component determines that said first record should be generated, then causing said first intelligent network component to provide first instructions to said switch to generate said first record;

causing said switch to determine whether said call is a dial-around call;

if said switch determines that said call is said dial-around call, then causing said switch to route said identification information to a second intelligent network component;

causing said second intelligent network component to provide second instructions to said switch to generate a second record;

in response to said first instructions from said first intelligent network component and said second instructions from said second intelligent network component, causing said switch to generate said first record and said second record;

causing said switch to send said first record and said second record to a billing system; and in response to receipt of said first record and said second record, causing said billing system to generate a third record relating to said dial-around call.

8. The method of claim 7, further comprising the steps of:

causing said second intelligent network component to instruct said switch to route said call to a dial-around number; and causing said switch to route said call to said dial-around number.

9. The method of claim 7, wherein said first intelligent network component is an advanced intelligent network (AIN) service control point (SCP), and wherein said step of causing said switch to route identification information corresponding to said call to said first intelligent network component further comprises causing said switch to route said identification information to said AIN SCP.

10. The method of claim 7, wherein said second intelligent network component is an intelligent network (IN) service control point (SCP), and wherein said step of causing said switch to route said identification information to said second intelligent network component further comprises causing said switch to route said identification information to said IN SCP.

11. The method of claim 10 wherein said IN SCP is an 800 service control point, and wherein said step of causing said switch to route said identification information to said IN SCP further comprises causing said switch to route said identification information to said 800 service control point.

12. In an intelligent switched telecommunications network, a system for capturing and recording dial-around call information, comprising:

a switch operative to receive a call;

a first intelligent network component functionally connected to said switch, said first intelligent network component being operative to receive identification information corresponding to said call, to determine whether said switch should generate a first record relating to said call, and to provide said switch with first instructions to generate said first record;

said switch being operative to read said identification information associated with said call, to determine whether said call is a dial-around call based upon said identification information, and to route said identification information to a second intelligent network component if said switch determines that said call is said dial-around call;

said second intelligent network component being functionally connected to said switch, said second intelligent network component being operative to receive said identification information, and to provide said switch with second instructions to generate a second record; and said switch being further operative to generate said first record in response to said first instructions from said first intelligent network component, and to generate said second record in response to said second instructions from said second intelligent network component.

13. The system of claim 12, further comprising a billing system functionally connected to said switch, said billing system being operative to receive said first record and said second record from said switch and to generate a third record relating to said dial-around call.

14. The system of claim 12, wherein said first intelligent network component comprises an advanced intelligent network (AIN) service control point (SCP).

15. The system of claim 12, wherein said second intelligent network component comprises an intelligent network (IN) service control point (SCP).

16. The system of claim 15, wherein said IN SCP comprises an 800 service control point.

* * * * *